(12) United States Patent
Hoots et al.

(10) Patent No.: US 9,010,721 B2
(45) Date of Patent: Apr. 21, 2015

(54) VALVE SWITCHBOX

(75) Inventors: Joshua Lee Hoots, Clemmons, NC (US); Jon Terence Stone, Clemmons, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 961 days.

(21) Appl. No.: 13/019,097

(22) Filed: Feb. 1, 2011

(65) Prior Publication Data

US 2012/0193558 A1 Aug. 2, 2012

(51) Int. Cl.
| | |
|---|---|
| F16K 35/06 | (2006.01) |
| F16K 35/10 | (2006.01) |
| F16K 51/00 | (2006.01) |
| F16K 35/00 | (2006.01) |
| F16K 1/20 | (2006.01) |
| F16K 37/00 | (2006.01) |

(52) U.S. Cl.
CPC ............... *F16K 35/00* (2013.01); *F16K 1/2007* (2013.01); *F16K 35/06* (2013.01); *F16K 37/0041* (2013.01)

(58) Field of Classification Search
USPC ............... 251/95, 98, 99, 101, 107, 108, 109, 251/111, 112, 113, 114, 115, 116, 286, 251/288; 70/175, 176, 177, 178, 179, 180; 137/385, 553, 554
See application file for complete search history.

(56) References Cited

U.S. PATENT DOCUMENTS

| | | | | |
|---|---|---|---|---|
| 2,076,839 | A * | 4/1937 | Heggem | ........................ 251/163 |
| 2,271,475 | A * | 1/1942 | Clade | .............................. 70/180 |
| 2,748,589 | A * | 6/1956 | Hulslander | ...................... 70/180 |
| 3,355,141 | A * | 11/1967 | Cooper | .......................... 251/101 |
| 3,808,895 | A * | 5/1974 | Fitzwater | ............................. 74/2 |
| 4,090,589 | A * | 5/1978 | Fitzwater | .................... 185/40 R |
| 4,173,150 | A * | 11/1979 | Gray | ................................ 73/714 |
| 4,361,308 | A * | 11/1982 | Buss | ......................... 251/129.12 |
| 5,244,008 | A * | 9/1993 | Bauer | ........................... 137/385 |
| 6,079,442 | A * | 6/2000 | Raymond et al. | ............. 137/554 |
| 6,676,109 | B2 | 1/2004 | Gomi et al. | |
| 6,708,720 | B2 | 3/2004 | Chapman | |
| 6,959,909 | B2 * | 11/2005 | Bancroft et al. | .............. 251/109 |
| 7,011,291 | B2 | 3/2006 | Miklo et al. | |

(Continued)

OTHER PUBLICATIONS

Hayward Butterfly Valves, "Hayward Flow Control Systems" (Jul. 24, 2007) (2 pages).

(Continued)

*Primary Examiner* — John K Fristoe, Jr.
*Assistant Examiner* — Jonathan Waddy
(74) *Attorney, Agent, or Firm* — McCarter & English, LLP

(57) ABSTRACT

A switchbox for monitoring the position of a manual quarter-turn valve has a housing mountable to the valve to be monitored/controlled. A handle-driven shaft extends through the housing, with one end of the shaft couplable to the valve stem such that movement of the shaft moves the valve stem. One or more shaft position sensor switches interact with a cam on the shaft to signal shaft position and/or provide control signals. A plate coupled to the shaft articulates within a recess on the surface of the switchbox to limit motion of the valve to an operable range, such as between full ON and full OFF. The switchbox has a pair of lock tabs with lock apertures. A lock aperture in the plate is alignable with the lock tab apertures to receive a pin or padlock for locking the valve in a selected position. A potentiometer can be utilized in place of a switch as a shaft position sensor. The switchbox may be used with an original or new handle and may feature detents to allow a range of valve settings.

14 Claims, 20 Drawing Sheets

(56) References Cited

U.S. PATENT DOCUMENTS

| | | | |
|---|---|---|---|
| 7,048,251 B2* | 5/2006 | Schreiner | 251/111 |
| 7,163,192 B2* | 1/2007 | Aoki et al. | 251/248 |
| 2007/0063157 A1* | 3/2007 | Miklo et al. | 251/101 |

OTHER PUBLICATIONS

Georg Fischer Technical Data Sheet entitled "GF Piping Systems" (marked Jun. 3, 2010) (1 page).

Asahi-America Catalog entitled "Ball Valve Stem Extensions and Options" (Sep. 2008) (1 page).

Kinetrol Catalog entitled "The Universal Limit Switch Box" (2006) (4 pages).

Data Sheet entitled "Rotork Valvekits—General Purpose Switchboxes" (marked Sep. 2010) (2 pages).

Westlock Controls Catalog entitled "Westlock AccuTrak 1040/2004 Rotary Position Monitors, Weathertight" (marked copyright 2009) (4 pages).

Moniteur Catalog entitled "Survivor-II VPT Thermoplastic—Corrosion Resistant / Division 2 Applications," (Applicant admitted prior art; e.g., Jun. 2009) (2 pages).

Non-Final Office Action dated Sep. 9, 2014 from U.S. Appl. No. 14/078,812 (13 pages).

* cited by examiner

VALVE SWITCHBOX

FIELD OF THE INVENTION

The present disclosure generally relates to apparatus for monitoring and controlling valves and more particularly to switchboxes with limit switches for controlling and monitoring manually operated, quarter-turn valves.

BACKGROUND OF THE INVENTION

Valves, such as ball valves and butterfly valves are ubiquitous for controlling fluid flow through piping and conduits in many environments. For example, in the industrial environment, valves control the flow of fluids and gasses through pipelines for material supply, venting, cooling/heating, hydraulic actuation and many other applications. While in the past, control valves were typically operated by hand, automated valve operation is becoming more common since it permits computerized and remote operation/control, e.g., from a control room, eliminating manual operation and its attendant labor and risks. In many instances, it is important to keep a valve opened or closed, within a predetermined range of operation, or at a specific degree of openness. These constrictions on valve position can be monitored and/or implemented by limit switches, which sense on valve position and either send a signal representative of position or enable/disable-open/close a circuit which can be used to control process equipment, e.g., a pump which pumps fluid through a pipeline controlled by the valve on which a limit switch is installed. It is known to utilize limit switches on electrically, pneumatically and hydraulically actuated valves to provide a mechanism for controlling valve position (to keep the valve within a predetermined range of motion), as well as to provide signal data indicative of valve position. While automated valves have become common, manual valves continue to be used, e.g., for backup purposes, such as for valves that may be actuated when the automatic valve or its supporting system (e.g., electrical power) fails or is purposely shut down. Manual valves are used as override valves for maintenance purposes and in emergencies, e.g., to assure that a pipeline is shut off. Further, a manual valve may, at times, be utilized for establishing a static degree of openness, e.g., for establishing a constant, reduced flow rate through a system. While limit switch use on manually-actuated valves is known, there is a need for limit switches and switchboxes having improved features and functionality, e.g., pertaining to retro-fitability and compatibility to existing valve assemblies, lockout capabilities, corrosion resistance and capability to maintain a given valve setting.

SUMMARY OF THE INVENTION

The present disclosure relates to apparatus to aid in controlling a valve having a body, a passageway through the body and an articulable member mounted to a valve stem and positioned within the passageway, the position of the articulable member determining the degree of openness of the passageway. The apparatus has a housing removably attachable to the valve body, a shaft extending through the housing, with one end of the shaft couplable to the valve stem such that movement of the shaft moves the valve stem. A shaft position sensor interacts with a position sensor actuator coupled to the shaft, with the position sensor actuator capable of inducing the shaft position sensor to acquire a state having an associated electrical property indicative of shaft position. The apparatus has a motion limiter coupled to the shaft for limiting the range of motion of the shaft and rotating conjointly therewith. A first lock member is coupled to the shaft and rotates conjointly therewith. A second lock member is coupled to the body, the first and second lock members selectively cooperative to allow the shaft to be locked in a first position. In accordance with an embodiment of the present disclosure, the motion limiter and the first lock member may be monolithic.

In accordance with a method of the present disclosure for controlling a manually operated valve having a body, a passageway through the body, an articulable member mounted to a valve stem and positioned within the passageway, the position of the articulable member determining the degree of openness of the passageway and an original handle attachable to the valve stem to facilitate turning the valve stem, the following steps may be conducted. Removing the original handle, then installing a switchbox on the valve, the switchbox having a housing removably attachable to the valve body, a shaft extending through the housing, one end of the shaft couplable to the valve stem such that movement of the shaft moves the valve stem, a shaft position sensor, a position sensor actuator coupled to the shaft, the position sensor actuator capable of interacting with the shaft position sensor to induce the shaft position sensor to acquire a state having an associated electrical property indicative of shaft position, a motion limiter coupled to the shaft for limiting the range of motion of the shaft and rotating conjointly there with, a first lock member coupled to the shaft and rotatable conjointly therewith, a second lock member coupled to the body, the first and second lock members selectively cooperative to allow the shaft to be locked in a first position. Installing one of the original handle or another handle. Selectively monitoring electrical signals from the position sensor representative of a position of the shaft; and selectively locking the valve in a selected position.

Additional features, functions and benefits of the disclosed apparatus, systems and methods will be apparent from the description and claims which follow, particularly when read in conjunction with the appended figures.

BRIEF DESCRIPTION OF THE DRAWINGS

To assist those of ordinary skill in the art in making and using the disclosed apparatus, reference is made to the appended figures, wherein.

DETAILED DESCRIPTION OF EXEMPLARY EMBODIMENTS

Figure 1:
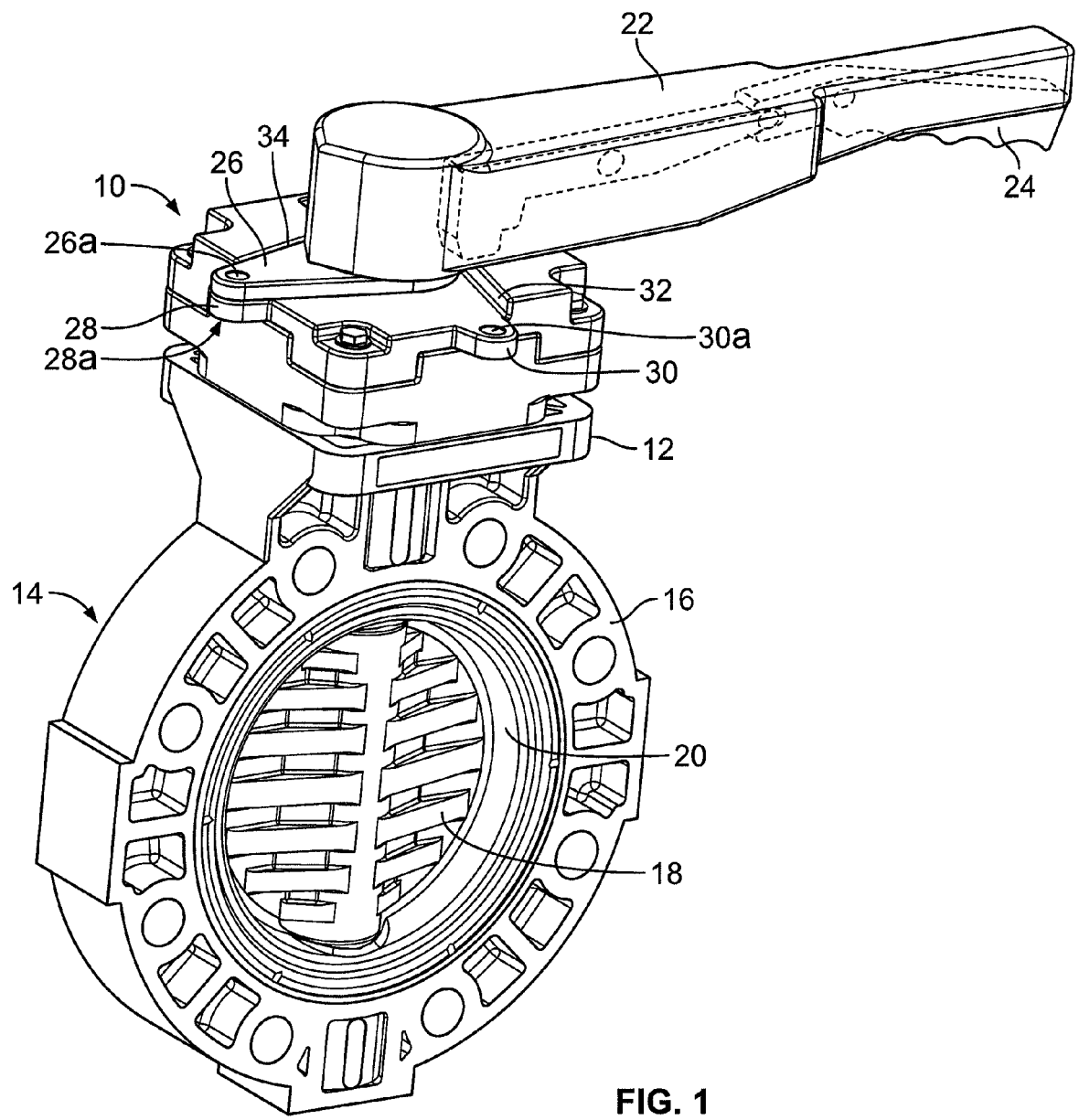
FIG. 1 is perspective view of a switchbox mounted on a valve in accordance with an embodiment of the present invention.
Figure 2:
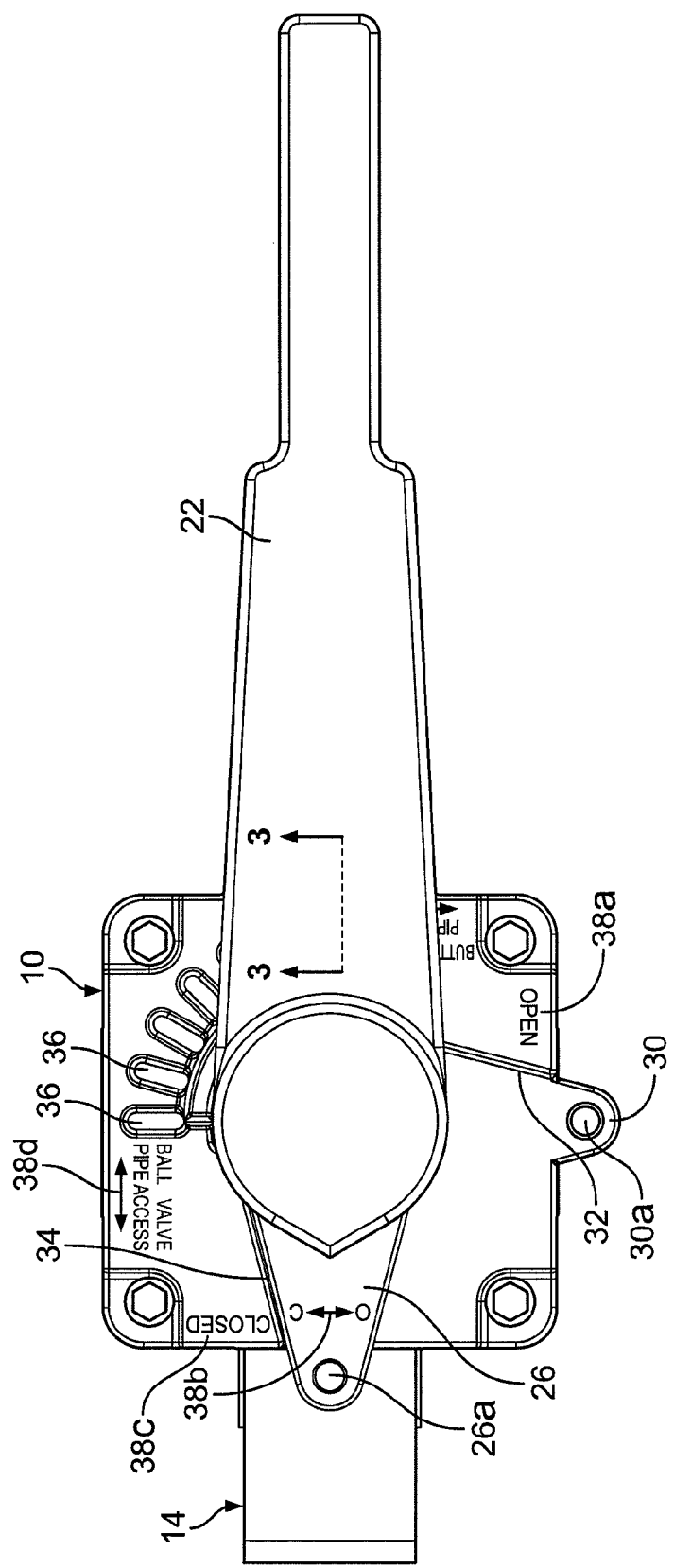
FIG. 2 is a top view of the assembly of FIG. 1.
Figure 3:
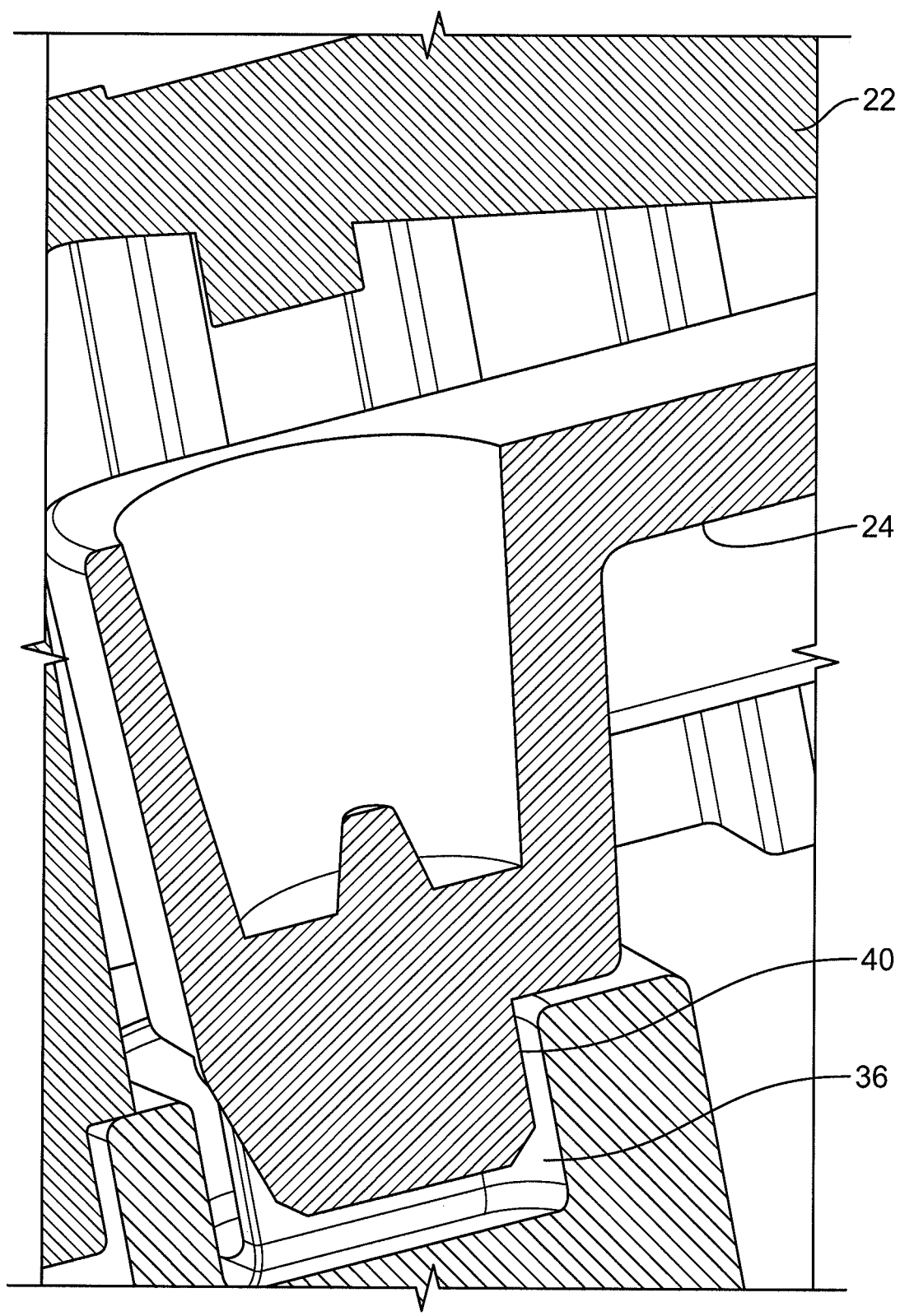
FIG. 3 is a cross-sectional view of a handle pawl and detent of the assembly of FIGS. 1 and 2 taken along section line 3-3 and looking in the direction of the arrows.

FIGS. 1 and 2 show a valve switchbox 10 in accordance with an embodiment of the present invention attached to the mounting plate 12 of a butterfly valve 14. This attachment may be accomplished by a plurality of screws or bolts extending up through the mounting plate 12 into threaded apertures in the switchbox 10, drawing the switchbox 10 into close mechanical engagement with the mounting plate 12. Alternatively, the mounting plate 12 could utilize a plurality of threaded studs or the switchbox 10 could have a plurality of apertures therein to allow bolts to secure the switchbox 10 to threaded apertures in the mounting plate 12. The valve 14 has a body 16 in which a shaft-mounted disc 18 articulates to open and close a throat 20 through which a fluid may pass (when open). In this disclosure, "fluid" would include liquids, gases and flowable solid particulates, etc. A handle 22 on the switchbox 10 is used to control the position of the disc 18 in the valve throat 20. Typically, a valve, such as valve 14, would be provided with a handle that would be attached directly to the shaft supporting the disc 18. As shown in FIG. 1, the valve switchbox 10 of the present disclosure can be positioned to intermediate between the handle 22 and the valve 14. An optional aspect of the present disclosure is that the handle of an existing valve 14 can be utilized with the switchbox 10 in instances when the switchbox 10 is retrofitted to the valve 14. In this manner, the handle will likely be properly sized for the given application, e.g., long enough to provide sufficient leverage to allow operation, as well as properly marked and colored, e.g., with indicia and colors symbolic of valve function, for identifying the composition of the fluid that is controlled by the valve 14, as well as open and close directions, warnings, etc. Alternatively, a new handle can be utilized with the switchbox 10, which has attributes more appropriate for the task it must perform. As shown in FIGS. 1, 2 and 3, the handle 22 may be provided with a position lock release 24, e.g., having a trigger lever that releases a positioning tooth 40 from an associated detent 36 to allow the valve 14 to be selectively locked in position and unlocked to allow re-positioning.

The switchbox 10 features a lock plate 26 that turns in unison with the handle 22 and is positionable in alignment with lock tabs 28 or 30 such that when the aperture 26a of the lock plate 26 is aligned with either aperture 28a or 30a, a pin, padlock, cable or other lock may be inserted there through to hold valve 14 in a specific position. These features may be utilized as safety features, e.g., to retain a valve 14 in the closed position while maintenance is conducted down-line of the valve 14 (to prevent someone from opening the valve inadvertently). Alternatively, the valve may need to be locked open to provide essential supply of material or cooling fluid down-line. The lock plate 26 may also have a configuration that allows it to function as a motion limiter. More particularly, the lock plate 26 shown may be limited to a range of motion between stop surface 34 (valve closed position) and stop surface 32 (valve open position). Alternatively, the switchbox 10 may be configured to allow full rotation of the valve 14 or embody different limits on the range of motion of the valve 14 by varying the position of the stop surfaces 32, 34, the shape and dimensions of the stop plate 26, or by utilizing moveable stop surfaces 32, 34 on adjustable (moveable) stops. As shown in FIGS. 2 and 3, detents 36 may be provided on the switchbox 10 to enable the handle 22 (and disc 18) to be movably positioned to a selected position (representing an associated degree of openness of the valve 14). The detents 36 permit the valve 14 to be positioned at a selected intermediate position between the opened and closed positions and to retain that selected position notwithstanding the force of fluid flow through the valve (until purposely repositioned by an operator). A spring or other resilient member (not shown) may be used to bias the tooth 40 into engagement with a detent 36. The various positions of the valve, instructions for use and other information may be expressed by indicia 38a-d that may be embossed or otherwise placed on the switchbox 10.

Figure 4:
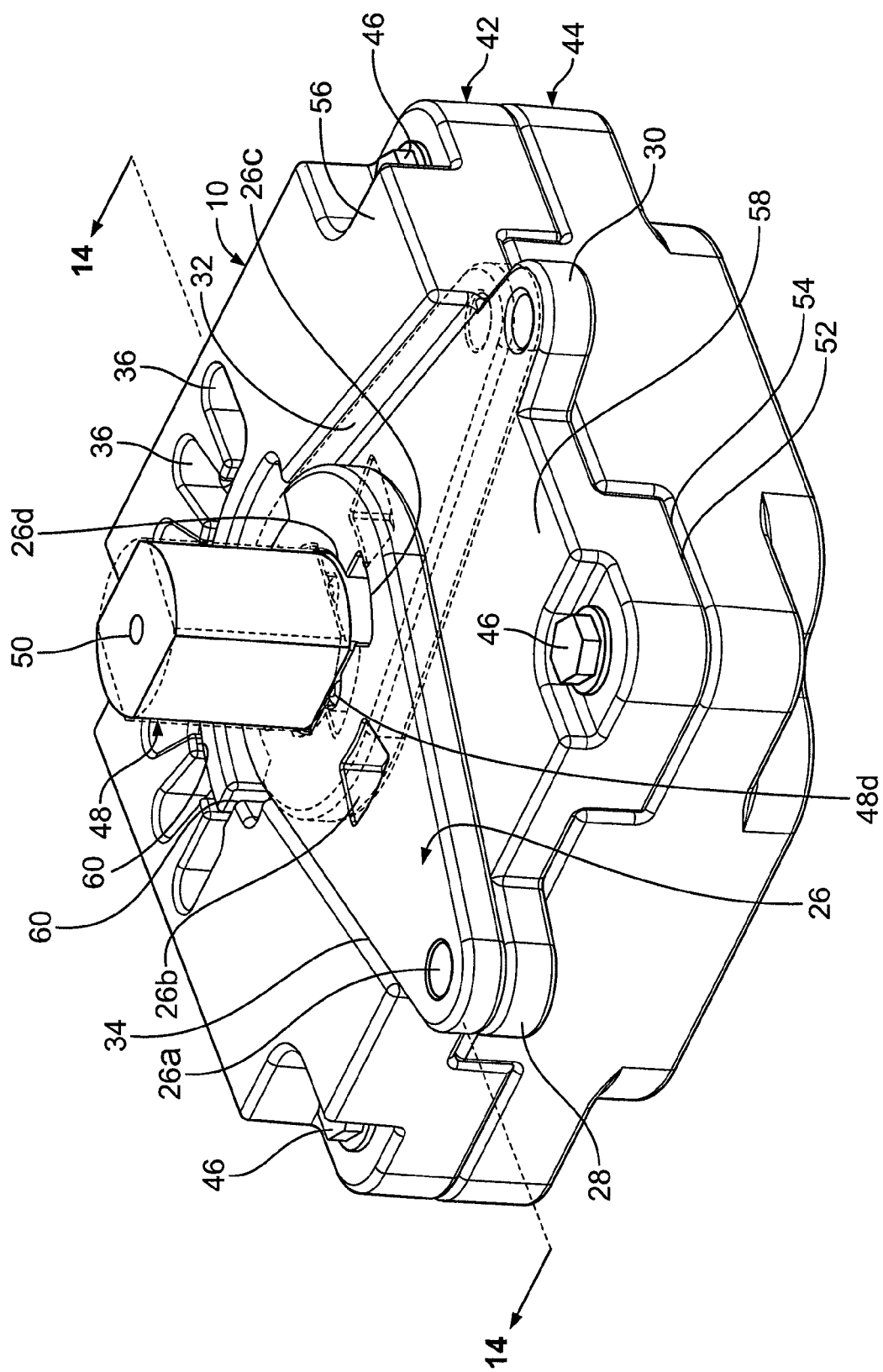
FIG. 4 is an enlarged perspective view of the switchbox of FIGS. 1 and 2 separated from the valve, with the handle removed and seen from the top.

FIGS. 4-11 show that the switchbox 10 has a cover 42 and a base 44, which may be attached by bolts or other fasteners 46 distributed around the periphery of the switchbox 10. Alternatively, the cover 42 may be glued or fused to the base 44, which would prevent access to the interior of the switchbox, which may or may not be preferred, depending upon the application, e.g., considering the non-adjustability and reliability of internal components, cost and other factors. A shaft 48 extends through the cover 42 for fitting to a handle or other turning apparatus, such as a motor driven member. The shaft 48 may be provided with a threaded aperture 50 for receiving a bolt or screw to hold the handle 22 on the shaft 48. Alternatively, the shaft 48 may retain the handle 22 by means of an interference fit, a set screw or other conventional means. The opposing mating surfaces 52, 54, respectively of the cover 42 and the base 44 have a generally complementary castellated shape, which prevents relative shearing motion and allows the fasteners 46 (disposed proximate the corners of the switchbox 10) to be recessed below the upper surface 56 of the cover 42 without substantially thinning the cover thickness. Recessing the fasteners below the surface permits the lock plate 26 to pass there over, as well as facilitating handle operation (without hitting knuckles or the handle 22) on upstanding fasteners 46 and also resists contaminant infiltration at the fastener openings 42b, 44b in the cover 42 and base 44, respectively (see FIG. 12). The upper surface of the cover 42 features a recessed area 58 defining the area through which the lock plate 26 can be articulated and delimited by the stop surfaces 32 and 34. The lock plate 26 shown is generally triangular in shape, but could be other shapes, depending upon the shape of the recessed area 58. When rotated to abut stop surface 34 (illustrated to be the closed position for the valve 14) the aperture 26a aligns with aperture 28a (see FIGS. 4 and 5) in lock tab 28, allowing a lock (not shown) to be slipped through the aligned apertures 26a, 28a, preventing the lock plate 26, shaft 48, handle 22 and valve 14 from being turned from the closed position. As shown in phantom view, the lock plate 26 can be rotated counter-clockwise to a position abuting stop surface 32 to the open position and locked there via lock tab 30. Detents 36 communicate with a relief groove 60 that communicates with the recessed area 58 of the cover 42 and optionally may extend across the recessed area (see FIG. 12). The relief groove 60 permits materials, e.g., fluids, which spill or condense on the cover in the area of the detents 36 to flow out of the detents 36, onto the recessed area 58 and off the cover 42. The recessed area 58 may also incorporate a groove or gutter (not shown) to channel fluids off the cover 42. In this manner, the likelihood of fluid intrusion into switchbox 10 or damage of the switchbox 10 by solvents is reduced and any fluids which could otherwise fill and obstruct the detents 36, e.g., after drying and hardening, is drained before drying. As shown in FIG. 4, the lock plate 26 may incorporate reliefs 26*b* and 26*c* to accommodate portions of the handle 22 in a retrofit application. The lock plate 26 has a shaft aperture 26*d* which mates with the shaft 48 to assure conjoint rotation. As shown more clearly in FIG. 13, the shaft 48 has a bead 48*d* accommodated in a mating recess in the shaft aperture 26*d* which assures a specific shaft-to-lock plate assembly orientation.

Figure 5:
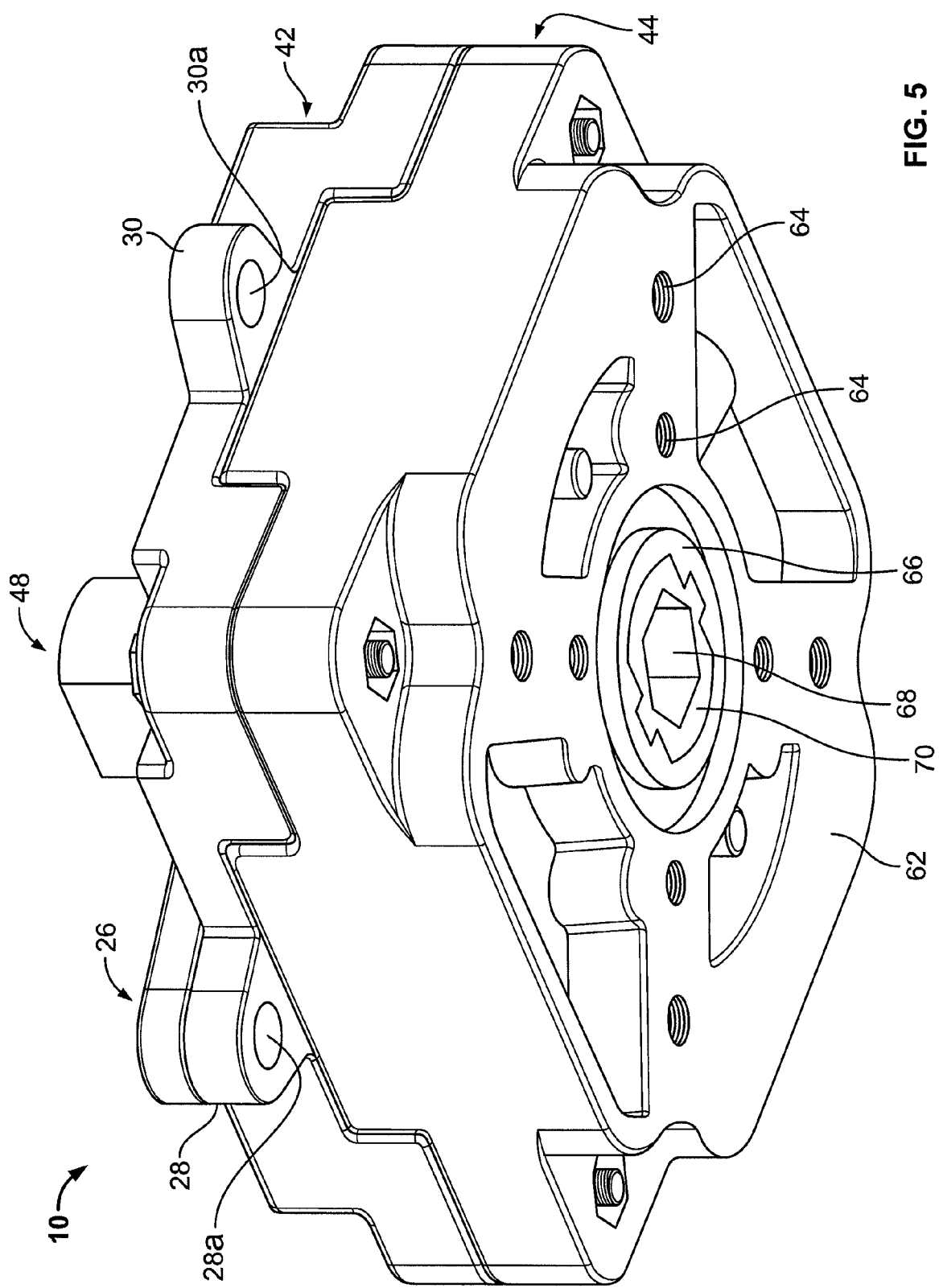
FIG. 5 is an enlarged perspective view of the switchbox of FIG. 4 seen from the bottom.
Figure 6:
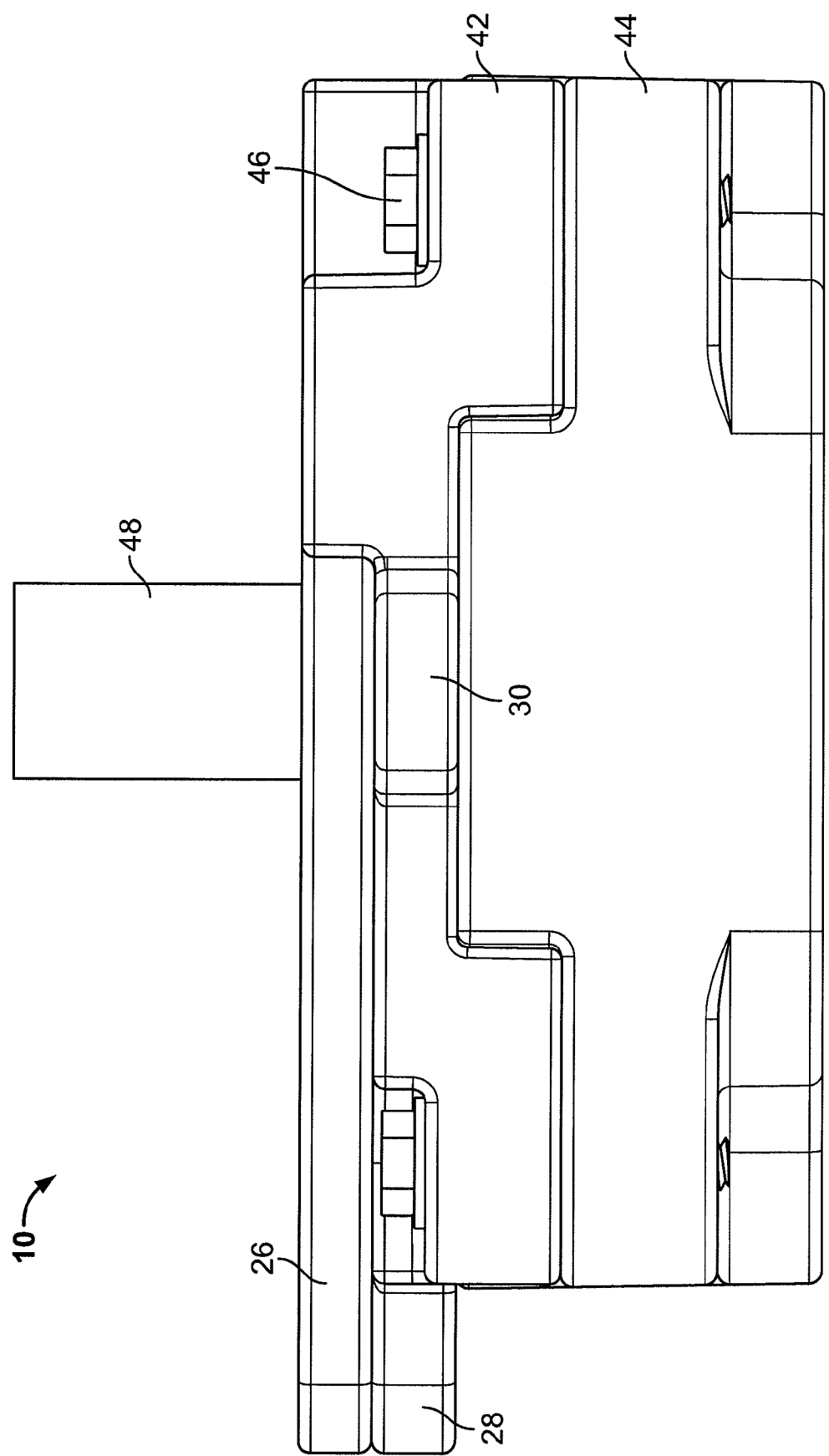
FIG. 6 is front view of the switchbox of FIG. 4 in elevation.

FIG. 5 shows that the bottom surface 62 of the switchbox 10 may have a plurality of mounting apertures, 64, e.g., for accommodating studs or screws (not shown). In the instance where the switchbox 10 is attached to a valve mounting plate 12 via bolts, the apertures 64 may be threaded. A plurality of apertures 64 may be provided to match a variety of bolt/fastener patterns and permit the switchbox 10 to be mounted to a variety of valves (mounting plates or adapters). An output socket 66 extending from or coupled to the shaft 48 has a central aperture 68 adapted to matingly accommodate a valve shaft in order to transfer rotational motion to the valve shaft. Alternatively, the central aperture 68 can be fitted with an adapter bushing 70 (see FIG. 14) for intermediating between the shape of the central aperture 68 and the shape of a given existing valve shaft. An adapter bushing 74 (see FIG. 19) may also be utilized to adapt a given shaft 48 to a given handle 22.

Figure 7:
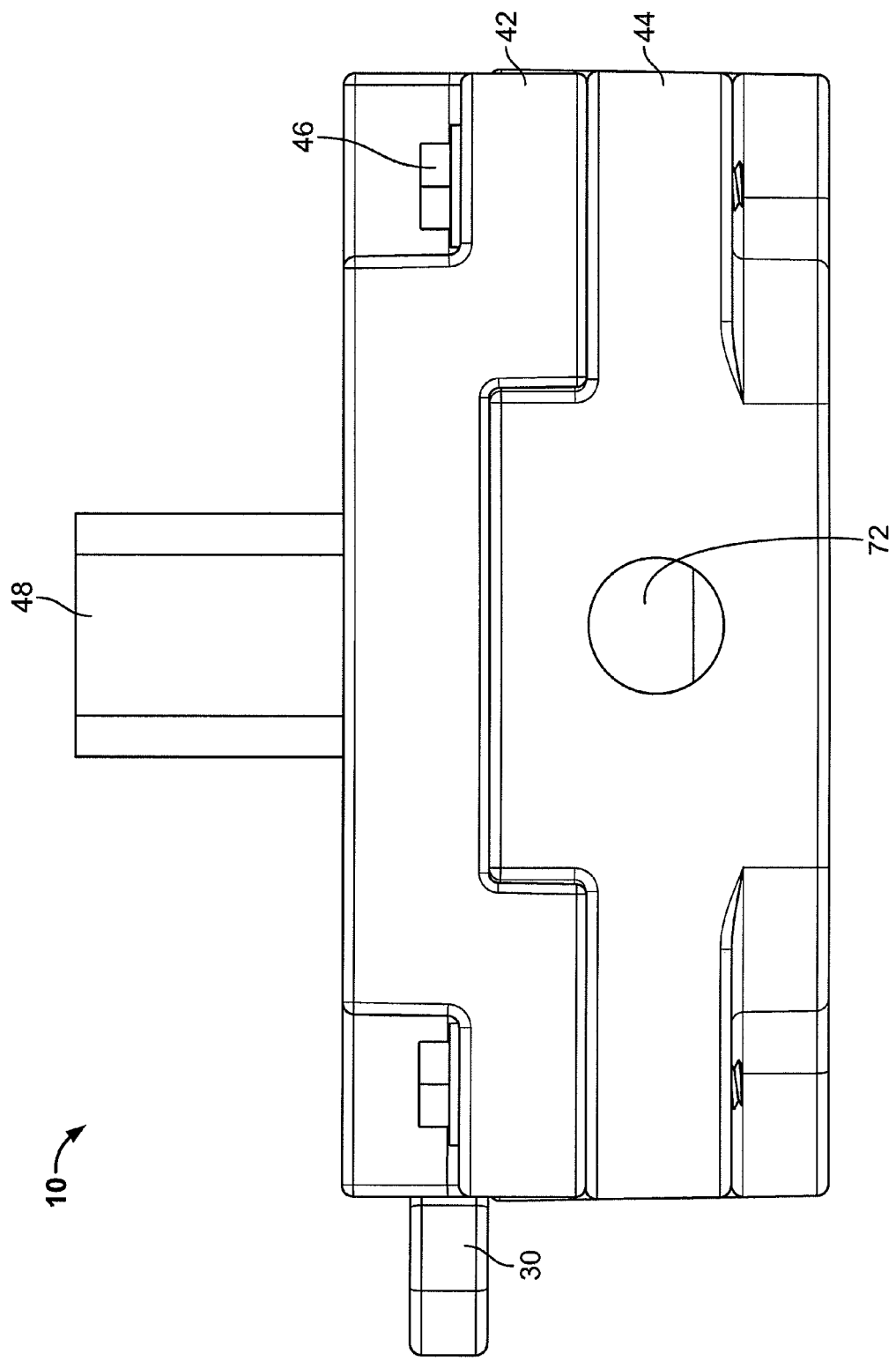
FIG. 7 is right side view of the switchbox of FIG. 4 in elevation.
Figure 8:
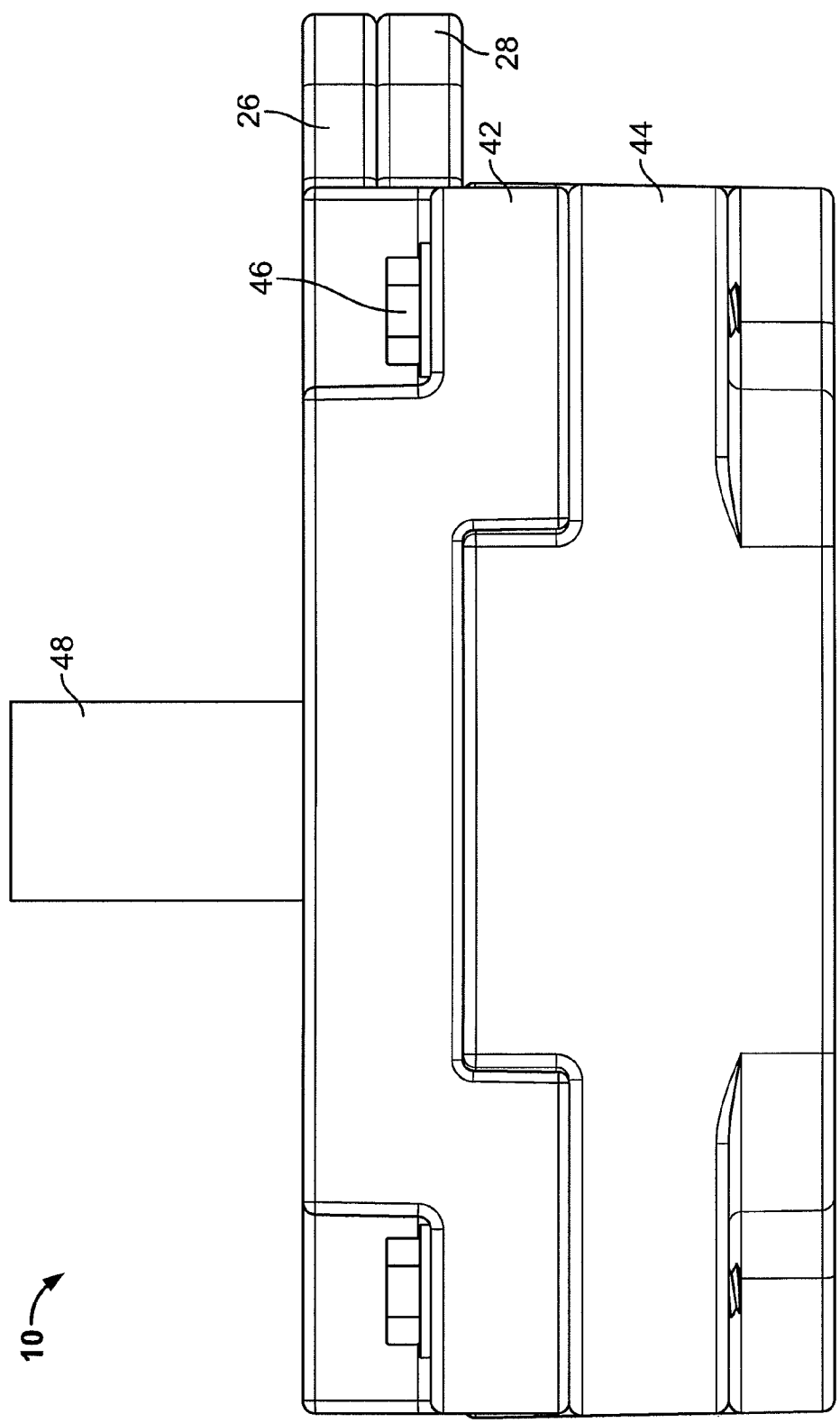
FIG. 8 is rear view of the switchbox of FIG. 4 in elevation.
Figure 9:
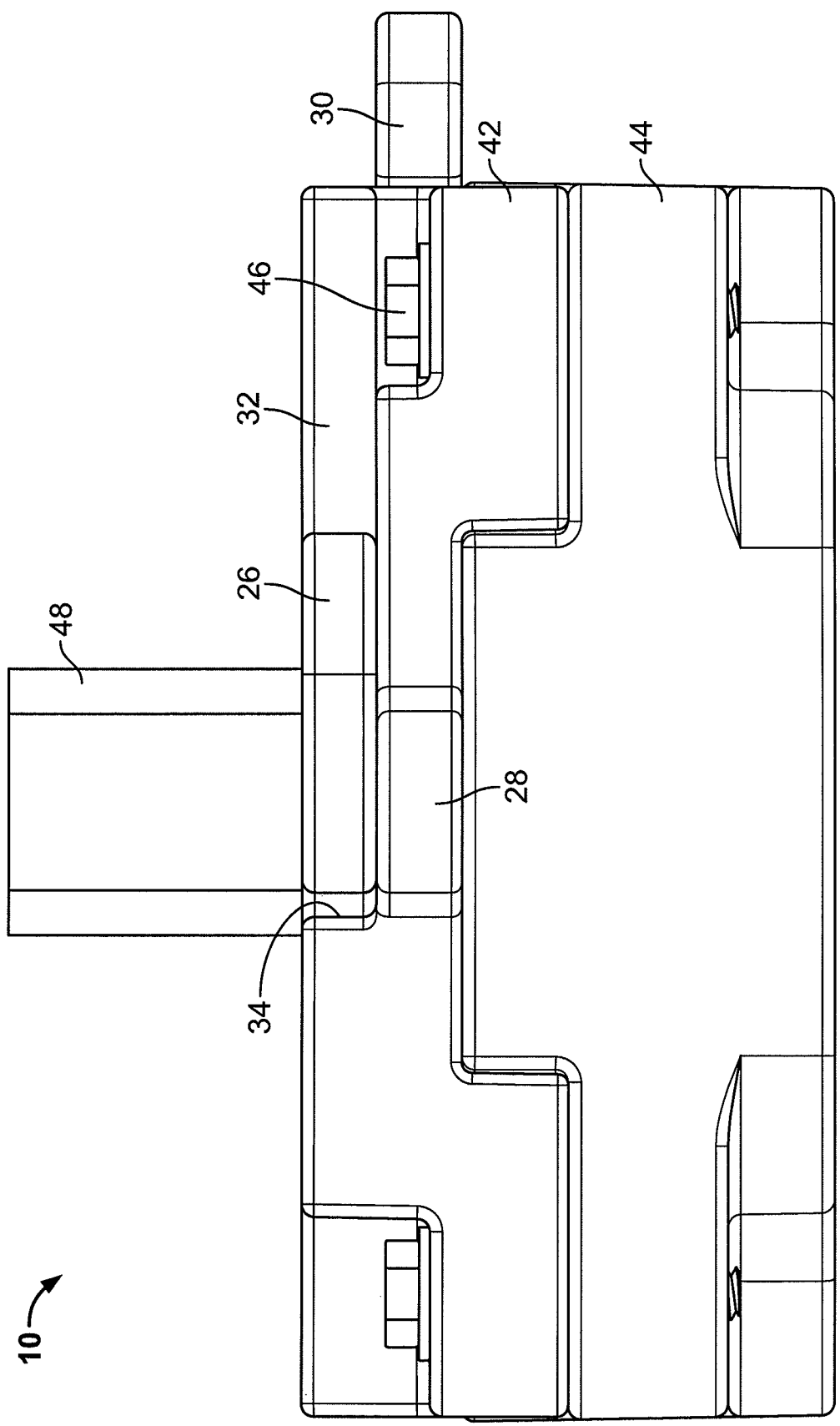
FIG. 9 is left side view of the switchbox of FIG. 4 in elevation.
Figure 10:
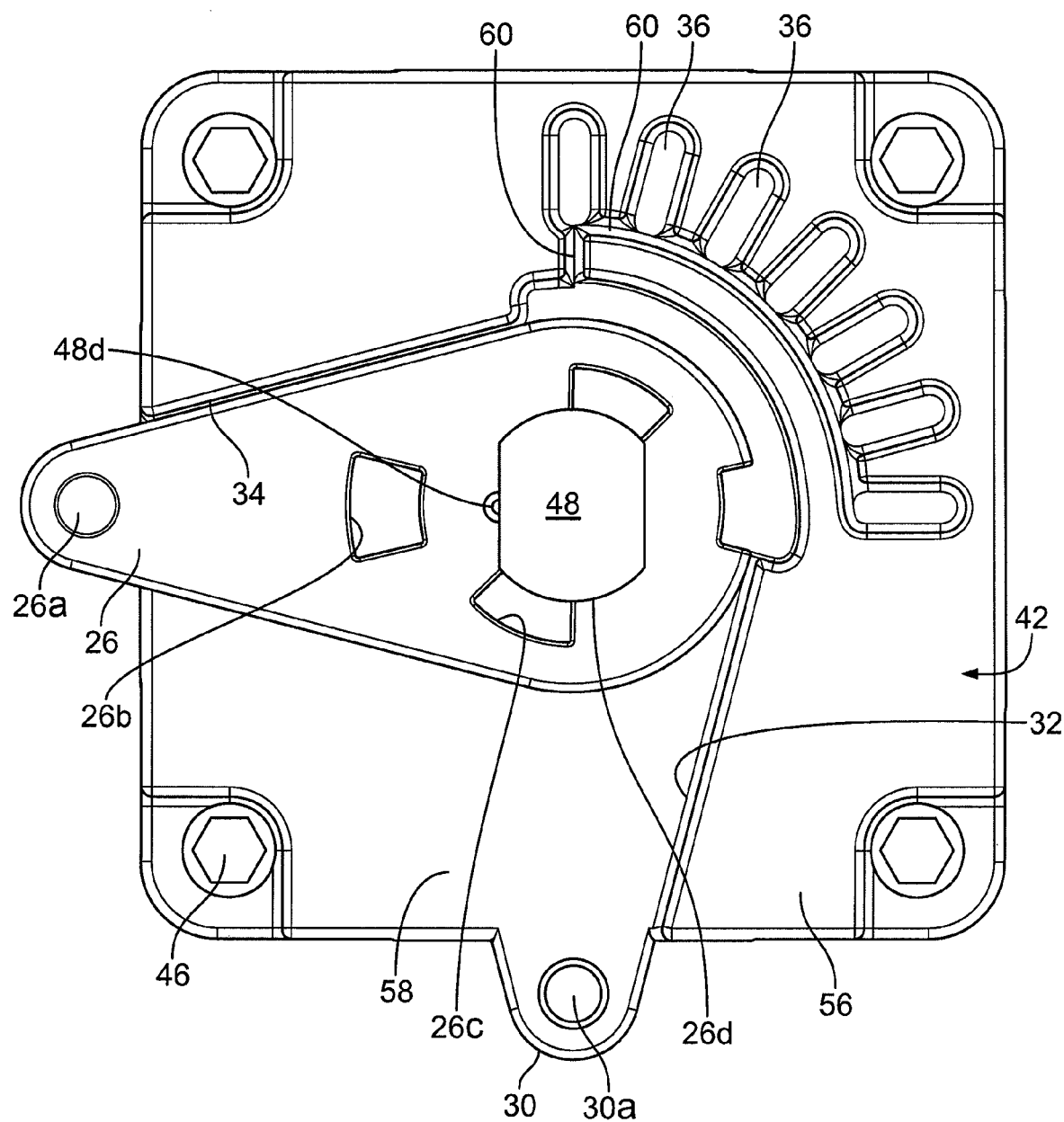
FIG. 10 is top view of the switchbox of FIG. 4.

FIG. 7 shows that the base 44 may be provided with an opening 72 to accommodate electrical wiring and may be adapted to receive and cooperate with electrical conduit to protect electrical wires entering the switchbox 10 and prevent intrusion of contaminants into the switchbox 10. Alternatively, quick-disconnect electrical connectors, such as Hirschmann connectors, pin connectors or the like may be used to connect external wiring to electrical components, e.g., switches 76, 78 (see FIG. 12) inside switchbox 10.

Figure 11:
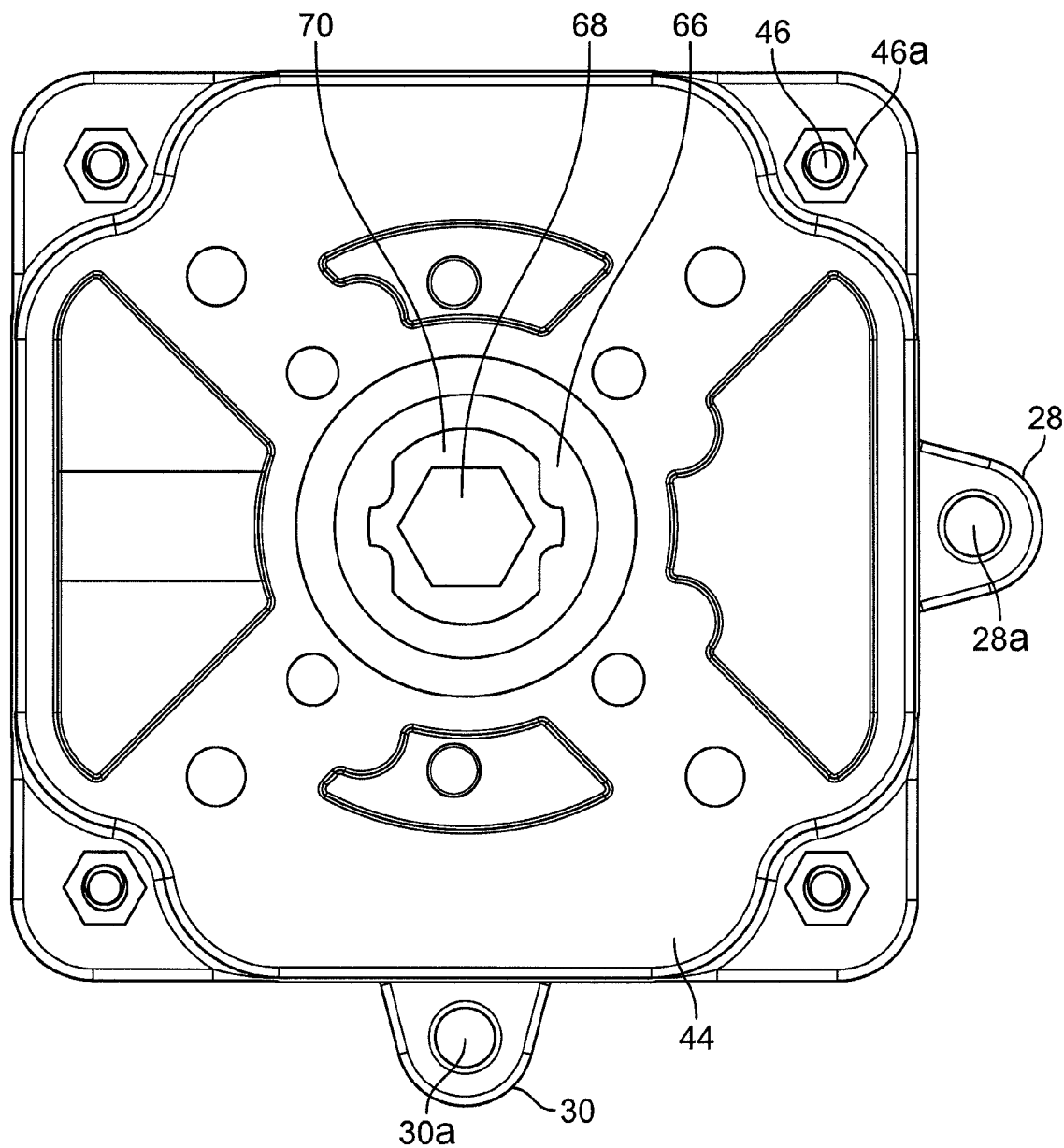
FIG. 11 is bottom view of the switchbox of FIG. 4.

FIG. 11 shows that the fastener 46 may be a bolt that interacts with a nut captured in base 44.

Figure 12:
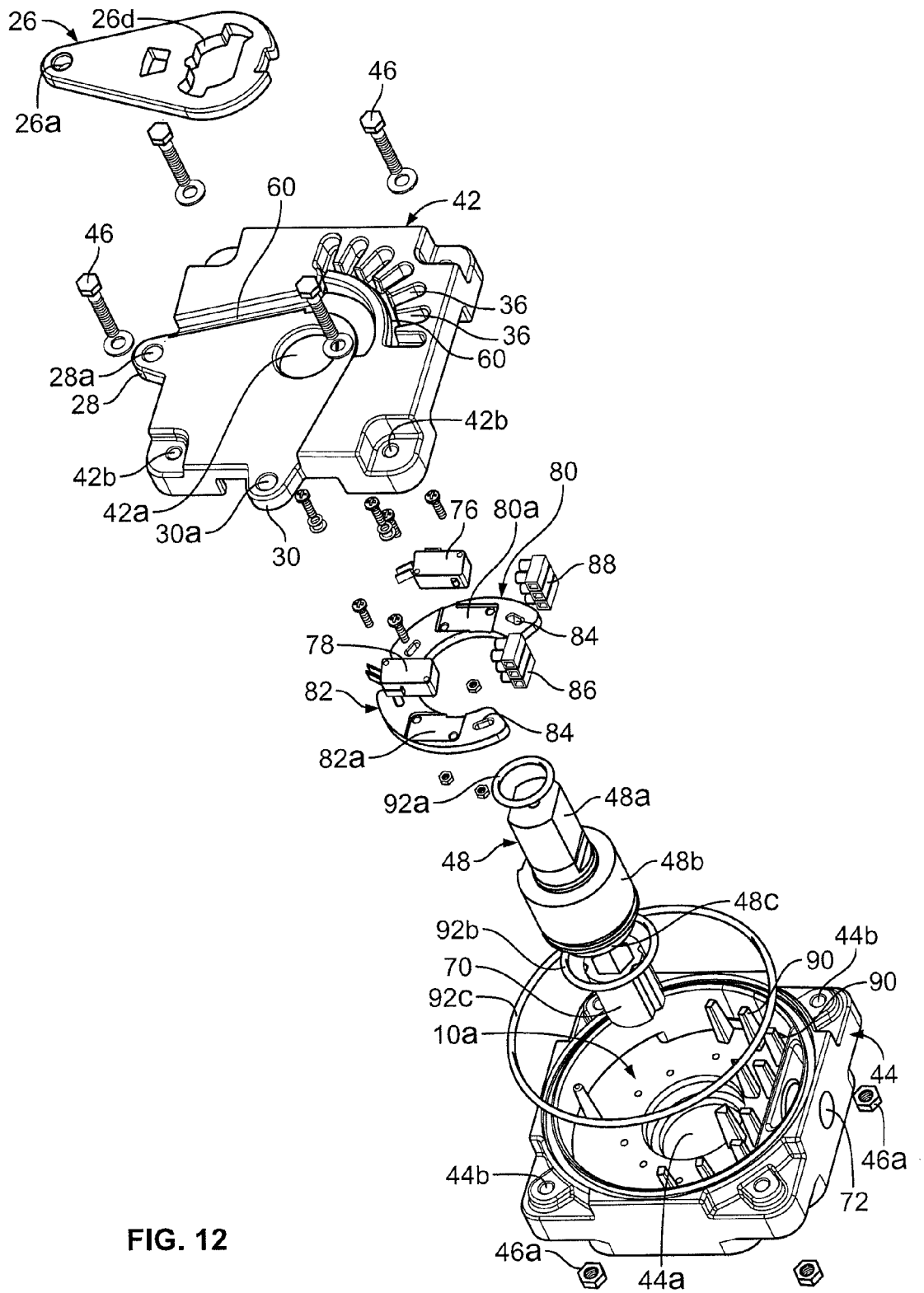
FIG. 12 is a exploded view of the switchbox of FIG. 4.

FIG. 12 shows the interior contents of the switchbox 10, i.e., within the interior hollow 10*a* thereof. The shaft 48 has an upper portion 48*a* adapted to couple to a handle 22 and a lower portion 48*b*, the outer exterior surface of which functions as a cam. A bottom portion 48*c* extends through a bore 44*a* in the base 44 to couple to a valve shaft (not shown) directly, or via an adapter 70. While a one-piece shaft 48 is depicted, the cam shape of the lower portion 48*b* could be executed as a separate element which could be glued, welded, keyed or otherwise retained on shaft 48 so as to turn in unison with the shaft 48. In the instance of a removable, separate cam element, a variety of cam shapes could be fitted to the shaft 48 in order to accommodate a variety of different switchbox applications. The lower portion 48*b* turns relative to switches 76, 78, which are mounted on corresponding mounting plates 80, 82, respectively, which feature recesses 80*a*, 82*a*, respectively for matingly receiving and holding the switches 76, 78 in a stable position. The switches 76, 78 may be retained in the recesses 80*a*, 82*a* by screws, rivets, glue or any conventional means. The mounting plates 80, 82 are retained by screws that thread into the base 44. Slotted holes 84 in the mounting plates 80, 82 permit adjustment along the range limited by the slotted holes 84, such that the switches can be positioned to actuate at a particular angular position of the cam. During installation, the valve 14 can be placed in a selected position, then the position of the switches 76, 78 adjusted. Proper operation can be verified based on switch 76, 78 output. Terminal blocks 86, 88 are retained in retainers 90 extending from the interior of the base 44 to retain wires (not shown) entering the switchbox 10 through opening 72. Alternatively, the terminal blocks 86, 88 could be retained in the switchbox 10 by screws, rivets, glue or any other conventional means, or the wiring could be connected directly to the switches 76, 78 without connecting to terminal blocks 86, 88. Seals 92*a*, 92*b* and 92*c* seal the cover 42 and the base 44 to the shaft 48 and the cover 42 to the base 44, respectively, preventing intrusion of contaminants into the switchbox 10.

Figure 13:
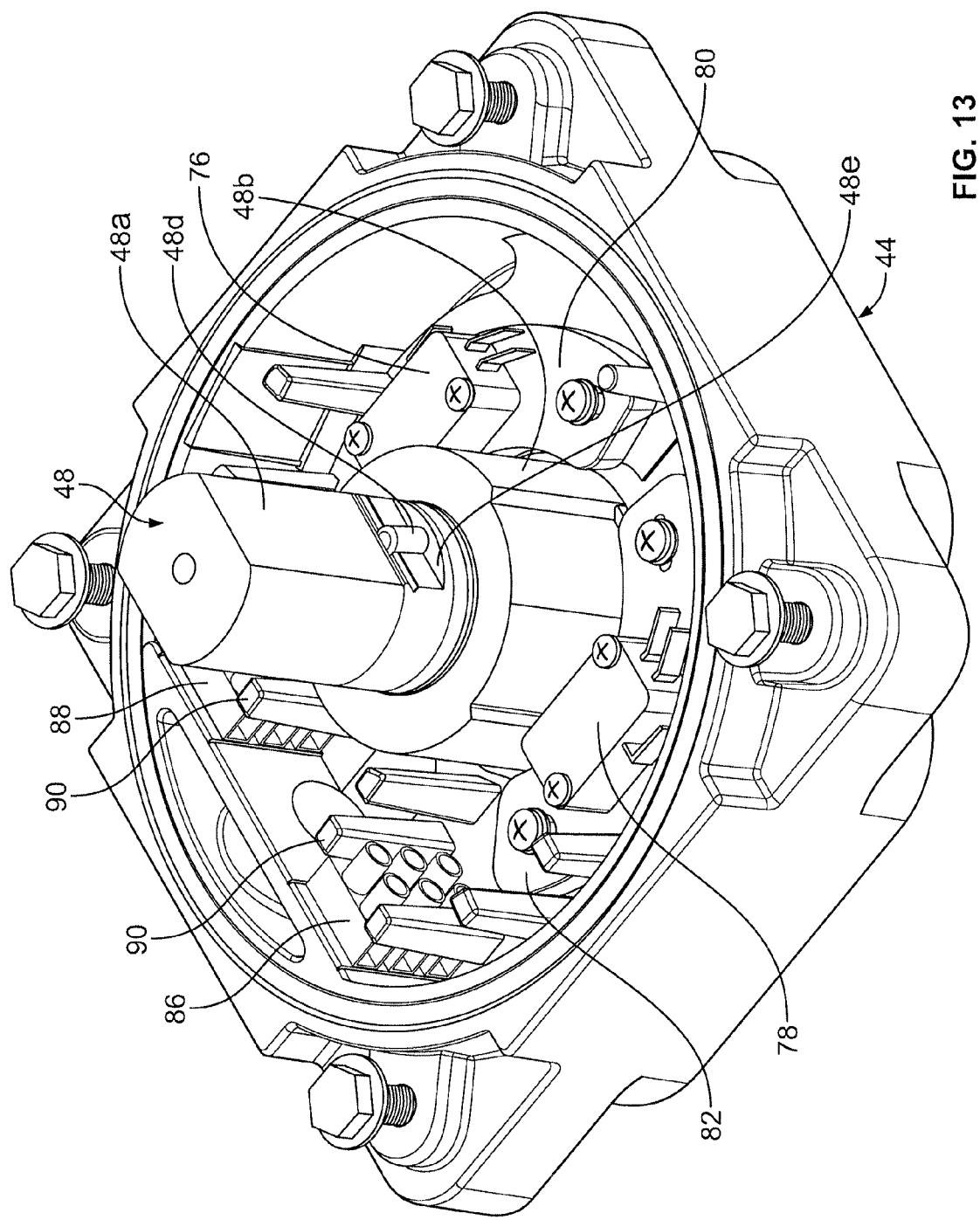
FIG. 13 is an enlarged perspective view of the interior of the switchbox of FIG. 4 with the cover and lock plate removed.
Figure 14:
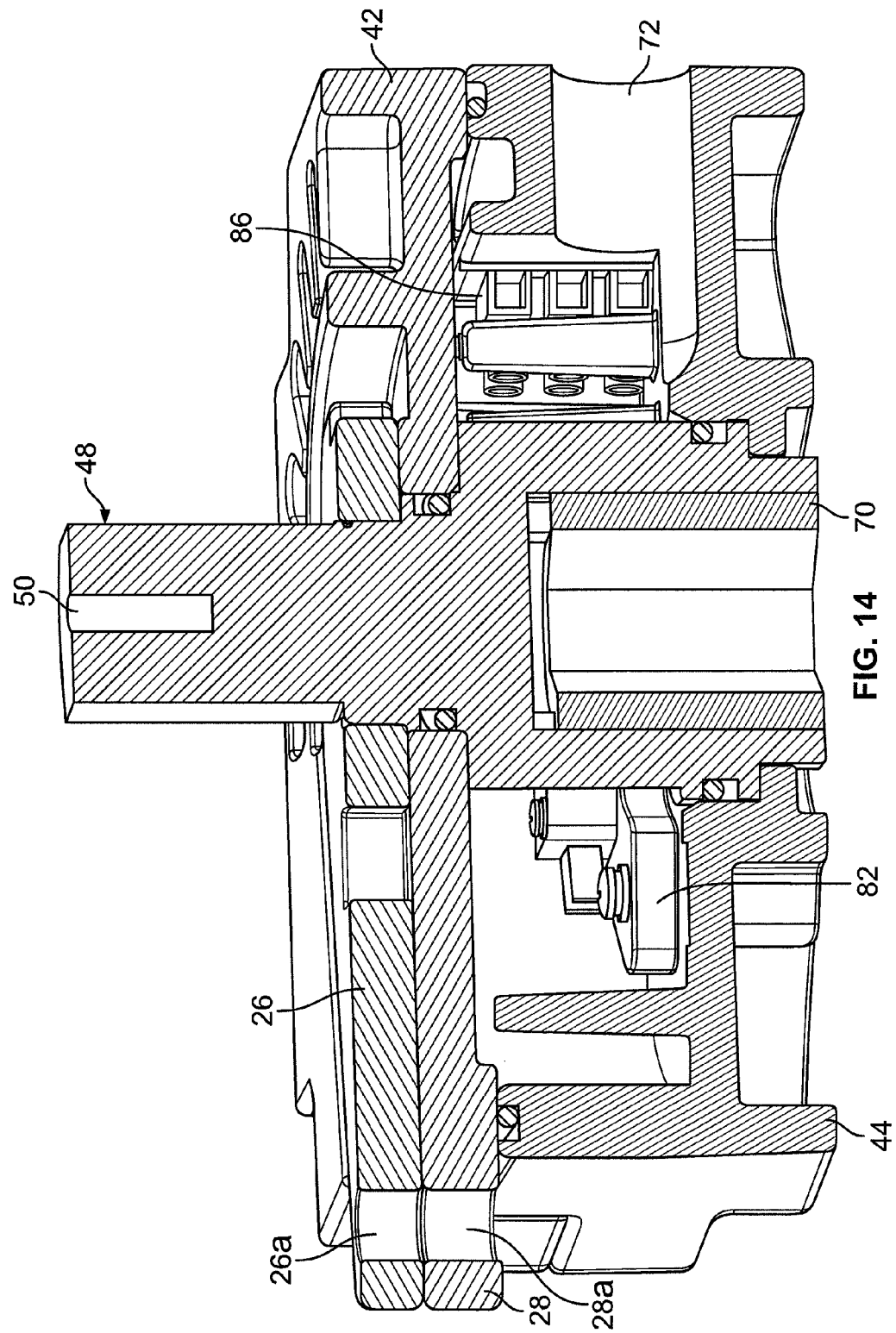
FIG. 14 is a cross-sectional view of the switchbox of FIG. 4 taken along lines 14-14 and looking in the direction of the arrows.

FIGS. 13 and 14 show the switches 76, 78 mounted to the mounting plates 80, 82, which are attached to the base 44. The terminal blocks 86, 88 are retained by retainers 90. (No wires are shown running between the exterior and the terminal blocks 86, 88 or between the switches 76, 78 and the terminal blocks 86, 88 for simplicity of illustration.) The shaft 48 has a lock plate mounting area 48*e* featuring a bead 48*d* that mates with a corresponding relief in the lock plate aperture 26*d* to establish a specific assembly orientation of the lock plate 26 relative to the shaft 48 and the lower portion 48*b* (cam). The switches 76, 78 may be used to signal the position of the shaft 48 by the cam shape of lower portion 48*b*, i.e., by being turned ON/OFF due to cam action on the switches, moving a switch actuator lever or button. Alternatively, switch operation may be a signal to turn an associated device, e.g., a pump, ON/OFF. For example, a pump which pushes fluid through the valve 14 may be disabled by a switch 76 or 78 when the shaft 48 is turned to a position representing a closed position of the valve 14, preventing the pump from exercising the fruitless function of attempting to urge a fluid through a closed valve. Using the same example, the OPEN position of the valve 14 may cause a switch 76, 78 to enable running of the pump. The switches 76, 78 may also be used to inform an operator or computer controller that the valve has achieved a specific position, corresponding to a degree of openness. For example, a closed valve 14 may cause a switch 76, 78 to signal to a controller that the valve is in a closed condition, such that the controller (human or automatic) will terminate pump operation. Further, if a signal is given to move the valve to the open condition, a switch 76, 78 may inform a controller that the valve 14 has achieved the desired state of openness. The switchbox 10 can accommodate more or fewer switches, each switch potentially performing indicating functions and/or enabling/disabling functions at selected positions of the valve 14. The switchbox 10 may be used for data collection (pertaining to valve position over time) and for process tracking.

Figure 15:
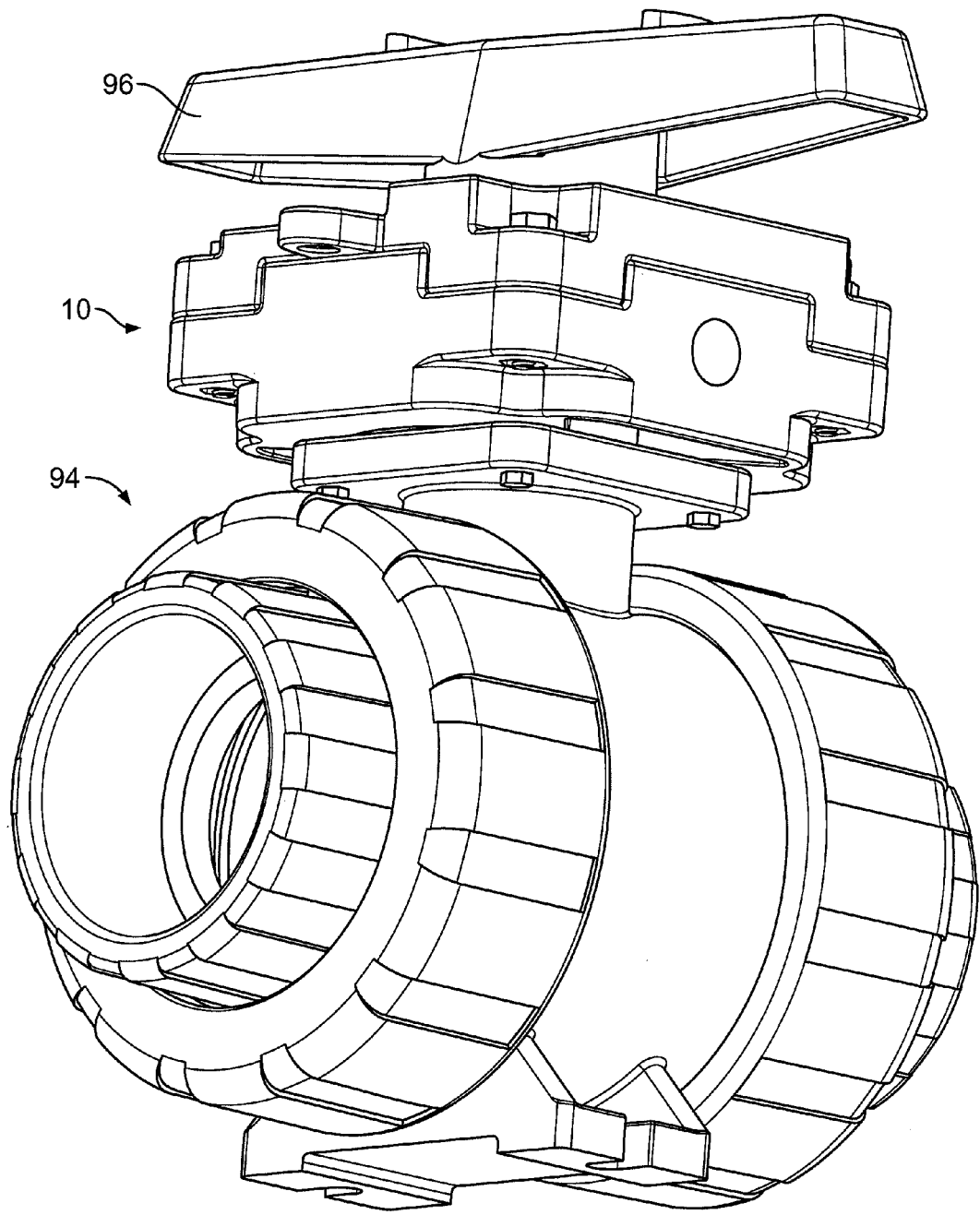
FIG. 15 is perspective view a switchbox in accordance with an embodiment of the present invention mounted on a ball valve.

FIG. 15 shows the switchbox 10 used in conjunction with a ball valve 94 with a T-handle 96, which, as shown, does not incorporate a detent engagement apparatus. Alternatively, the T-handle could incorporate a mechanism to engage detents 36.

Figure 16:
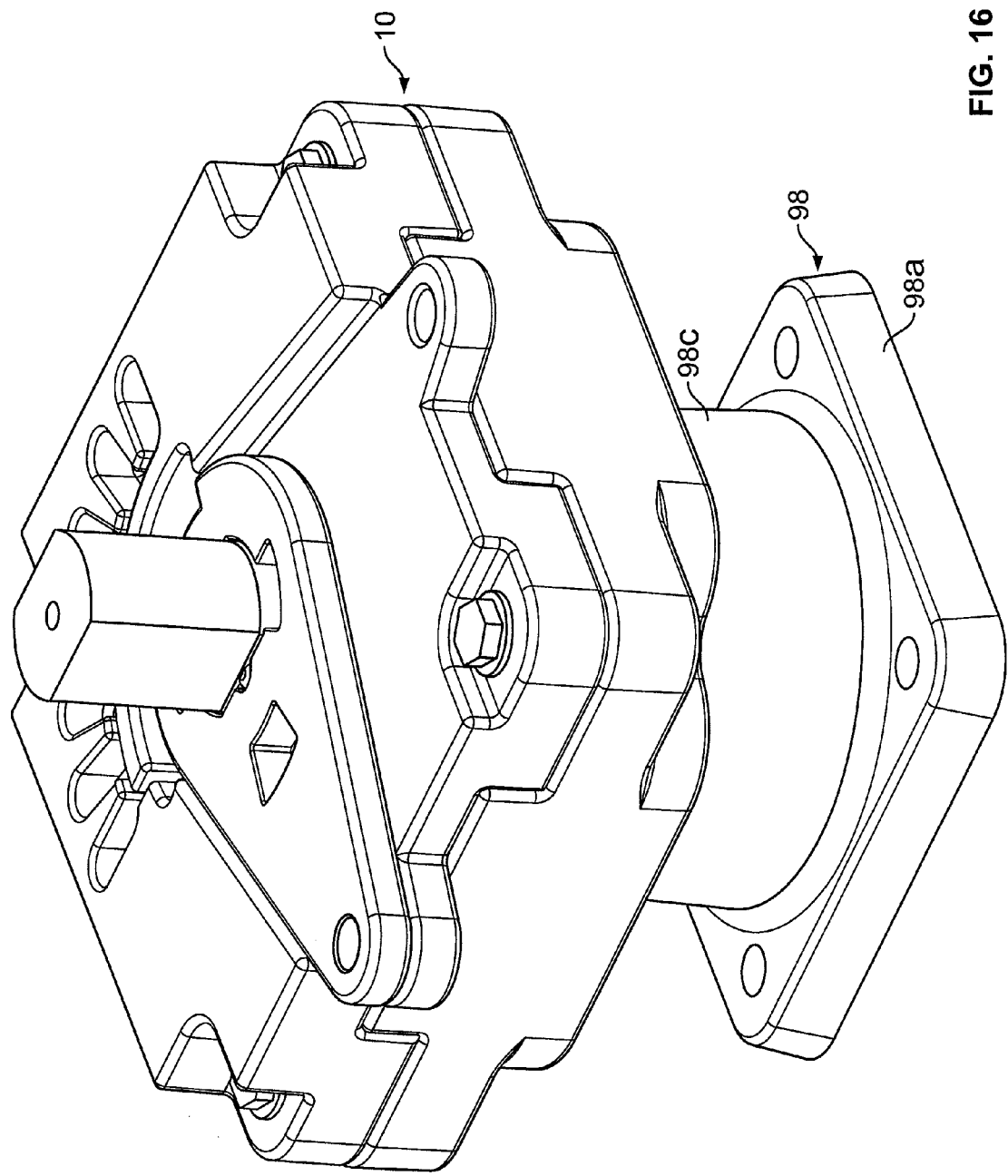
FIG. 16 is a top perspective view of a switchbox with a valve mounting adapter in accordance with an embodiment of the present invention.
Figure 17:
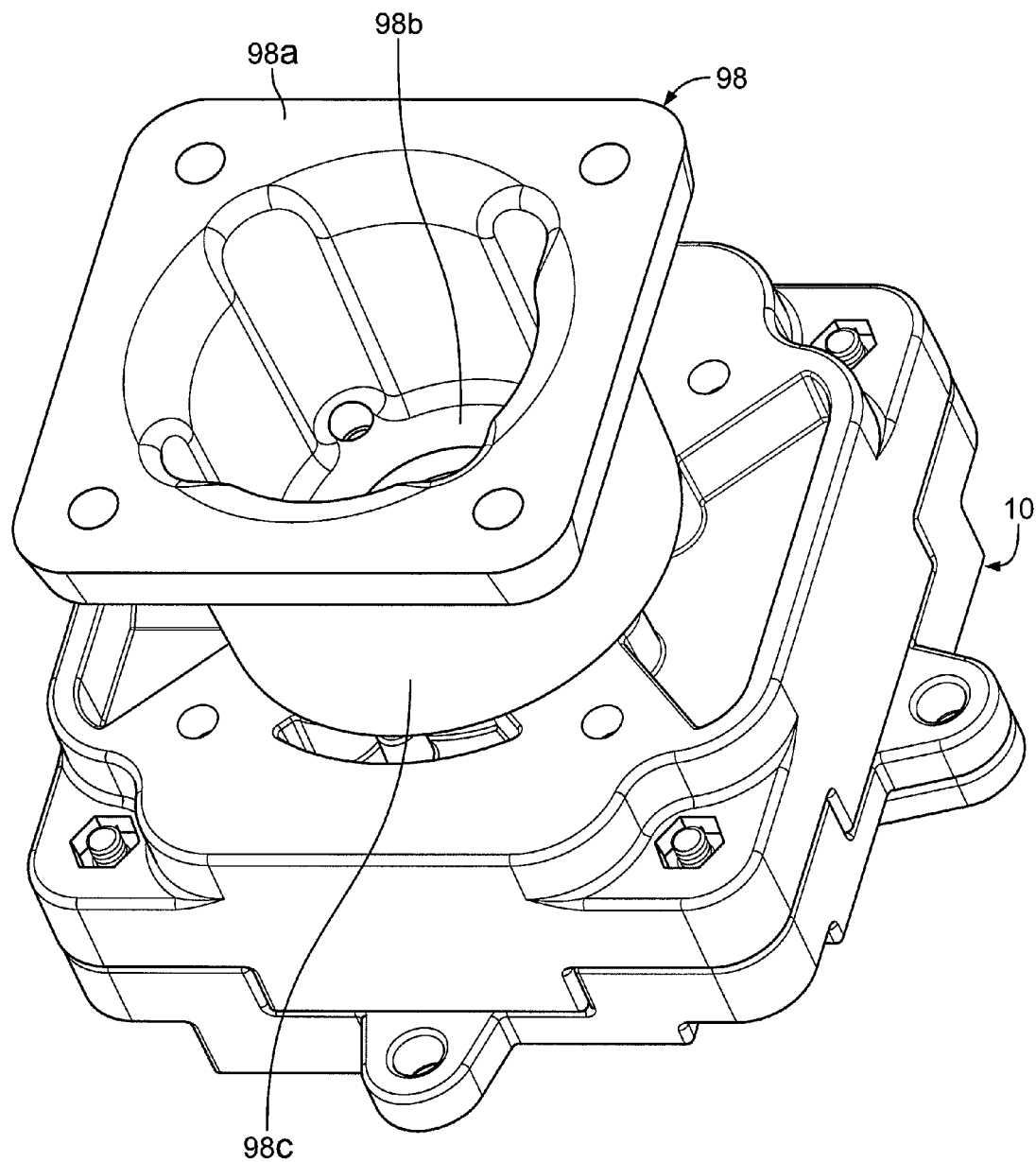
FIG. 17 is a bottom perspective view of the device shown in FIG. 16.
Figure 18:
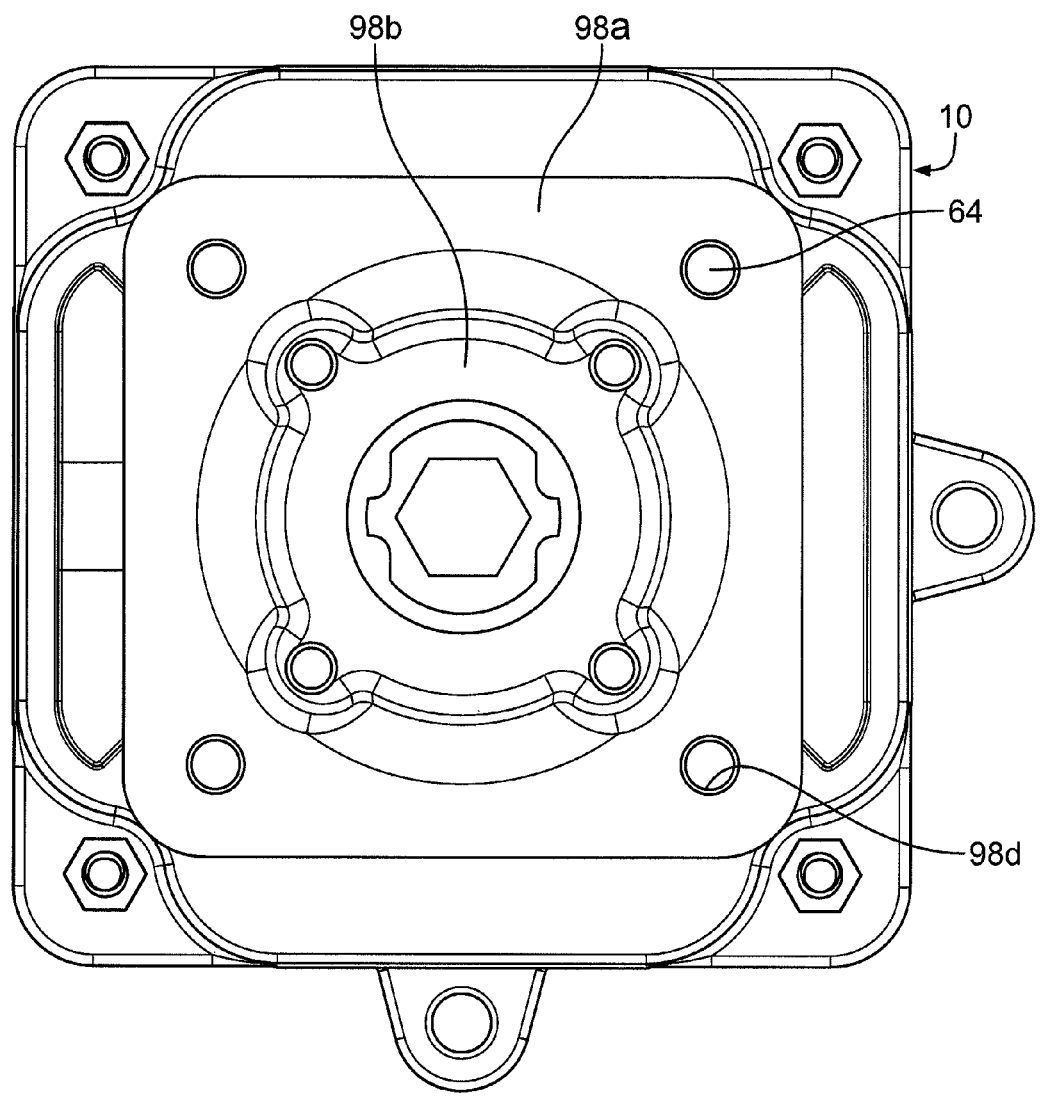
FIG. 18 is a bottom view of the device of FIG. 16.

FIGS. 16-18 show the switchbox 10 coupled to a mounting plate adapter 98 having a primary mounting plate 98*a* which would be coupled to a valve, like valve 14 or 94, a secondary mounting plate 98*b* which couples to the switchbox 10, and an intermediate portion 98*c* connecting the primary and secondary mounting plates 98*a* and 98*b*. The coupling of the mounting plate adapter 98 to the valve 14, 96 may be by screws, nuts and bolts, studs or bolts threadedly received in apertures 64, 98*d*, clamps or other conventional means.

Figure 19:
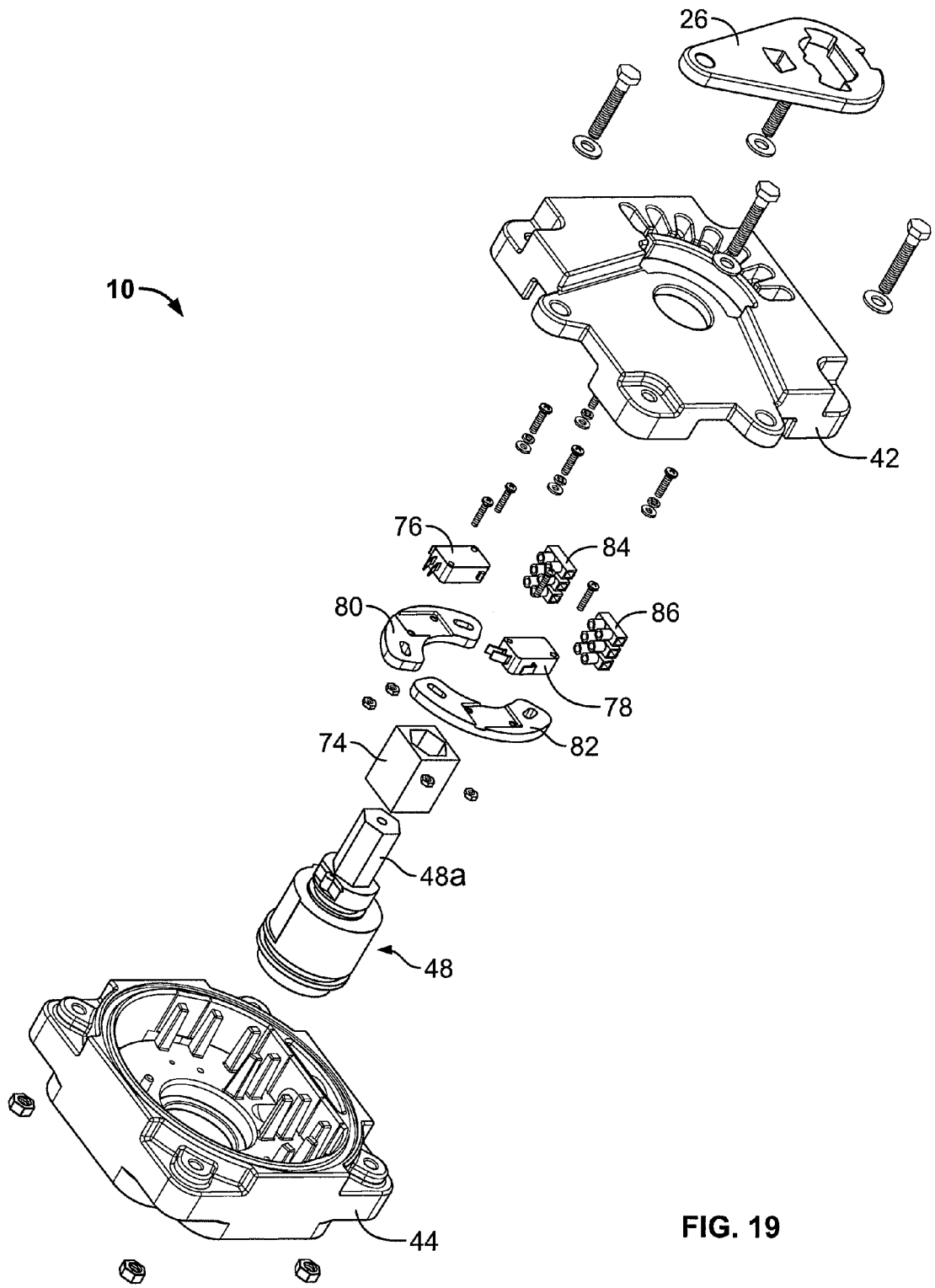
FIG. 19 is an exploded view of a switchbox in accordance with an exemplary embodiment of the present invention and having a adapter sleeve on the input shaft.

FIG. 19 shows a switchbox 10 which utilizes an adapter bushing 74 on the upper portion of the shaft 48*a* to receive a mating handle, such as handle 22 (see FIG. 1). The adapter bushings 70 (see FIG. 12) and 74, mounting plate adapter 98 (see FIG. 16) and the provision of a plurality of mounting aperture 64 patterns, promote the universal use of the switchbox 10 to a variety of valve applications with either the original valve handle or a replacement handle 22. In the instance that the original handle incorporates lockout features that are incompatible with the switchbox 10, the switchbox 10 provides any necessary lockout feature, i.e., via the interaction of a lock with the lock plate 26 and lock tabs 28, 30 (through alignment of the aperture 26*a*, with aperture 28*a* or 30*a* and insertion of the lock through the aligned apertures). It is understood that a manual valve may have lockout features whereas an automated valve may not, in that, a locked-out condition of a manually operated valve will be observable to the operator of the valve and no effort would be expended in futilely attempting to turn the valve. In the instance of an automated valve, the automated valve actuator may not have a means to sense that the valve is locked and the actuator may futilely attempt turning resulting in damage to the valve or the actuator.

Figure 20:
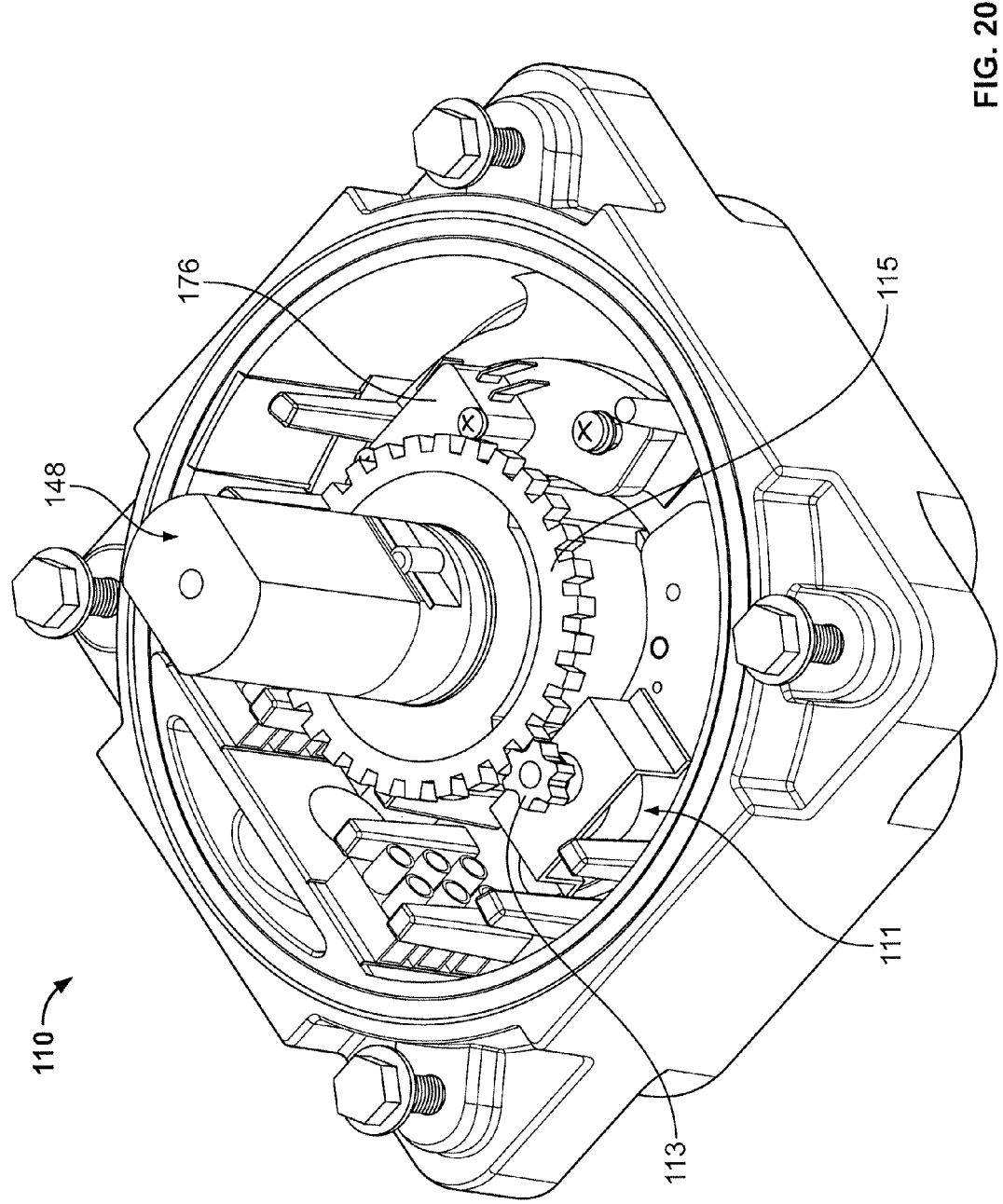
FIG. 20 is a perspective view of the interior of a switchbox in accordance with an exemplary embodiment of the present invention, with the cover removed.

FIG. 20 shows a switchbox 110 wherein one of the switches is replaced with a potentiometer 111. The potentiometer 111 can signal a variable resistance based upon rotational displacement, such that a potentiometer gear 113 which is rotated by a shaft-mounted gear 115 can be utilized to ascertain the rotational position/displacement of the shaft 148 (and an associated valve (like valve 14 or 94) via electronic interpretation of the potentiometer output, such as by an analog-to-digital converter. In this manner, the position of the shaft and associated valve can be determined at any position and is not restricted to discrete positions associated with cam-induced switch signaling. The potentiometer 111 and potentiometer gear 113 can be retrofitted to a shaft 148 having a configuration like that of shaft 48 shown in FIG. 12 and can optionally be used in conjunction with one or more cam-driven switches 176. Because a potentiometer output may be stored or interpreted as zero at any given angular position of turn, there is no need to adjust the angular mounting position of the potentiometer 111 within the switchbox 110, e.g., by way of an adjustable mounting plate, such as 80, 82 (see FIG. 12). A mounting plate, 80, 82 of an appropriate thickness could be utilized to establish the alignment of potentiometer gear 113 and shaft-mounted gear 115 by setting the height of the potentiometer 111.

The switchbox 10, 110 may be made from metal or plastic and such material may be selected to be corrosion-resistant and compatible with a given piping system, e.g., plastic construction for a plastic piping system. Plastics which may be used include PVC, CPVC and GFPP. Plastic composition is often lighter and may be preferred in applications requiring lighter weight. These comments as to material of composition apply to the cover 42, base 44, mounting plates 80, 82, as well as the shaft 48, 148. The shaft 48, 148 may also be made from 300 or 400 Series stainless steel or aluminum depending upon the application.

The switchbox 10 provides electronic indication/control based upon valve position. These features can be conferred on a mechanically operated valve and the switchbox is retrofittable to a manual valve which originally did not have such indication and control capability. It should be appreciated that a manually-operated valve 14 may be driven by automated apparatus or vice versa, by subsequent connection/disconnection from automated apparatus, such as a motor. For example, an automated valve may have the automatic rotating equipment disconnected and a handle installed either temporarily or permanently, in its place. In either case, the switchbox may be incorporated on the valve intermediate either the manual handle or the automated turning apparatus, either permanently or temporarily.

What is claimed is:

1. An apparatus to aid in controlling a valve having a body, a passageway through the body and an articulable member mounted to a valve stem and positioned within the passageway, the position of the articulable member determining the degree of openness of the passageway, comprising:
   a housing removably attachable to the valve body;
   a shaft extending through the housing, one end of said shaft couplable to the valve stem such that movement of said shaft moves the valve stem;
   a shaft position sensor;
   a position sensor actuator coupled to said shaft, said position sensor actuator capable of interacting with said shaft position sensor to induce said shaft position sensor to acquire a state having an associated electrical property indicative of shaft position;
   a motion limiter coupled to said shaft for limiting the range of motion of said shaft and rotating conjointly therewith;
   a first lock member coupled to said shaft and rotating conjointly therewith;
   a second lock member coupled to said housing, said first and second lock members selectively cooperate to allow said shaft to be locked in a first position;
   wherein the housing has a base and a cover coupled to the base via a fastener member; and
   wherein opposing mating surfaces of the cover and the base have a complementary castellated shape that: (i) allows the fastener member to be recessed below an upper surface of the cover, and (ii) permits the motion limiter to pass over the fastener member during rotation of the motion limiter.

2. The apparatus of claim 1, wherein said motion limiter and said first lock member are monolithic.

3. The apparatus of claim 2, wherein said shaft position sensor is contained within a hollow section of said housing between the cover and the base.

4. The apparatus of claim 3, wherein said cover has a recessed surface defining said upper surface on a top surface thereof and at least partially defined in extent by a first stop surface and a second stop surface, said motion limiter moving substantially parallel to said recessed surface between said first stop surface and said second stop surface.

5. The apparatus of claim 4, wherein said motion limiter has a first aperture therethrough defining said first lock member, said second lock member having a second aperture therethrough, said first position characterized by alignment of said first and second apertures enabling a lock to be inserted through both apertures.

6. The apparatus of claim 5, further comprising a third lock member coupled to said housing and having a third aperture therethrough, said third lock member positioned on said housing at a position removed from the position of the second lock member, said first aperture and said third aperture aligning at a second position in which said shaft may be selectively locked.

7. The apparatus of claim 5, wherein said position sensor is a switch.

8. The apparatus of claim 7, wherein said position sensor actuator is a cam installed on said shaft and adapted to cooperate with said switch.

9. The apparatus of claim 8, wherein said switch has an adjustable mounting on said base to allow the relationship between shaft position and switch actuation to be changed.

10. The apparatus of claim 5, wherein said position sensor is a potentiometer.

11. The apparatus of claim 10, wherein said potentiometer has a first gear and said position sensor actuator is a second gear installed on said shaft and adapted to cooperate with said first gear to turn said potentiometer.

12. The apparatus of claim 4, wherein said valve is a manually actuated valve and further including a handle attachable to said shaft for turning said shaft.

13. The apparatus of claim 12, further including detents on said cover, said handle having a detent engager to selectively lock and release said handle and said shaft in a rotary position.

14. The apparatus of claim 13, further including a drainage channel to drain fluid away from said top surface of said cover.

\* \* \* \* \*